United States Patent [19]
Beach

[11] 3,712,200
[45] Jan. 23, 1973

[54] FILM CREEP PREVENTING MEANS FOR CAMERAS

[75] Inventor: David E. Beach, Penfield, N.Y.
[73] Assignee: Eastman Kodak Company, Rochester, N.Y.
[22] Filed: Dec. 17, 1971
[21] Appl. No.: 209,209

[52] U.S. Cl..................95/31 FM, 226/59, 352/191
[51] Int. Cl..........................G03b 1/22, G03b 17/42
[58] Field of Search...........95/31 FM, 31 AC, 31 FL; 352/191; 226/59, 147, 149

[56] References Cited

UNITED STATES PATENTS 3,471,228  10/1969  Martin.................................352/191
3,599,850  8/1971  Whitley..............................352/191 X

FOREIGN PATENTS OR APPLICATIONS 427,492  4/1935  Great Britain......................352/191

*Primary Examiner*—Robert P. Greiner
*Attorney*—W. H. J. Kline et al.

[57] ABSTRACT

A camera includes a transport mechanism for advancing perforated film along an exposure plane. A film sensing pawl is movable between a retracted position on one side of and spaced from the exposure plane and a position resting against the film surface where it may fall into a perforation of the advancing film to disable the transport mechanism when the perforation reaches a predetermined position. The sensing pawl may be held in its retracted position when the film is not being advanced. A member is movable into contact with the film after the film has been advanced to prevent the film creeping along the exposure plane.

11 Claims, 11 Drawing Figures

PATENTED JAN 23 1973 3,712,200

FILM CREEP PREVENTING MEANS FOR CAMERAS

CROSS-REFERENCE TO RELATED APPLICATIONS

Reference is made to commonly assigned, copending U.S. Pat. applications Ser. No. 203,733, entitled CAMERA, filed in the names of David E. Beach and Jeffrey R. Stoneham on Dec. 1, 1971; Ser. No. 203,524, entitled FILM METERING MECHANISM FOR CAMERAS filed in the name of David E. Beach on Dec. 1, 1971; and Ser. No. 203,732, entitled FILM ADVANCE AND METERING MECHANISM FOR CAMERAS filed in the name of Alexander A. Peterson on Dec. 1, 1971.

BACKGROUND OF THE INVENTION

1. Field of the Invention

This invention relates to devices for metering perforated film in roll film cameras, and more particularly to such a device adapted to eliminate or reduce the risk of film movement after the film has been advanced.

2. Description of the Prior Art

Devices for metering successive roll film exposures by arresting the film winding mechanism in response to the sensing of perforations or notches precut in the film at specific intervals are old and well known in the art. Commonly assigned, U.S. Pat. application Ser. No. 203,733, entitled CAMERA, filed on Dec. 1, 1971 in the names of David E. Beach et al shows a camera film transport mechanism including a sensing pawl which detects the arrival of a perforation at a predetermined location to disable the transport mechanism. A shutter release lever may then be depressed to first withdraw the sensing pawl from the perforation and to then activate the shutter mechanism to take a picture. While cameras having such devices are satisfactory, the operator must depress the shutter release lever with sufficient force to overcome the spring force urging the sensing pawl into the film perforation. This may tend to cause camera unsteadiness resulting in blurred pictures.

To overcome the above-mentioned problem of camera movement resulting from the required excessive force to overcome the spring force on the pawl, coassigned U.S. Pat. application Ser. No. 203,524, entitled FILM METERING MECHANISM FOR CAMERAS, filed in the name of David E. Beach discloses an invention wherein a film sensing pawl is not removed from the perforation by the shutter release lever, but instead remains in the film perforation until after a picture has been taken and the film transport mechanism has begun to advance film. The pawl is resiliently urged against the trailing edge of a perforation by a spring during the exposure period. It has been found that occasionally the pressure on the film from the sensing pawl coupled with vibrations in the camera during operation of the shutter will cause film movement during the exposure interval, thereby causing blurred pictures.

One possible method of eliminating such film movement is to reduce the spring force on the pawl so that there is less tendency for the film to move. However, this may lead to early metering failure due to the fact that when the pawl is removed from the perforation, the spring which has urged the pawl against the trailing edge of the perforation is used to return the pawl to a ready position for detecting the presence of the next succeeding perforation to be advanced along the exposure plane. If the spring force has been reduced, the pawl may not return to its ready position because of the frictional resistance between the pawl and the film surface.

It has been found that the problems described above can be eliminated by leaving the pawl in a film perforation only during that period of time when the film is being advanced and by removing the pawl from the perforation before the picture-taking operation. Such a mechanism is shown in co-assigned U.S. Pat. application Ser. No. 203,732, entitled FILM ADVANCE AND METERING MECHANISM FOR CAMERAS, filed in the name of Alexander A. Peters on Dec. 1, 1971. This permits the use of a relatively heavy spring for returning the pawl to its ready position without putting undue force on the film during shutter operation, and yet eliminates the need for a large force on the shutter release lever to withdraw the pawl from the perforation during the picture-taking operation.

It has been found that in cameras of the type disclosed in the Peters application wherein the film sensing pawl is withdrawn from the perforation after the film has been advanced, there is a possibility of film creep. Film creep is the movement of film along the exposure plane toward the take-up chamber, and it is caused by torsional forces on the take-up film roll. Normally, the static frictional forces on the film from camera and/or cartridge parts is sufficient to prevent such movement. However, if the camera is vibrated or jarred, such as for example by normal road vibrations in an automobile, the static friction forces may be overcome and the film may creep.

When a camera in which the film has creeped is used to take a picture, that exposure may slightly overlap the next succeeding exposure, producing a less satisfactory result. Further, since processors normally cut roll film at positions determined by the perforations in the film, and since the exposure frame of film which has creeped will be misaligned with the corresponding perforation, a portion of that frame will be cut away and will appear in the next frame.

SUMMARY OF THE INVENTION

I have found that the problem of film creep associated with cameras wherein the film sensing pawl is removed from a perforation after the film has been advanced can be eliminated by providing a member movable at that time to a position contacting the film to thereby prevent the film from moving along the exposure plane. Therefore, it is an object of the present invention to provide, in cameras wherein the pawl is withdrawn from the film perforation after film advance, a member movable into contact with the film at such time.

Accordingly, I have invented a camera having a brake member movable between an active position contacting received film to prevent film movement along the camera's exposure plane and an inactive position. In two of the illustrated embodiments of the camera, the brake member is moved from its active position in response to the film transport mechanism being disabled, and two other embodiments the brake member is moved to its inactive position during operation of the film transport mechanism.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because cameras are well known, the present description will be directed in particular to elements forming part of, or cooperating more directly with, apparatus in accordance with the present invention. It is to be understood that camera elements not specifically shown or described may take various forms well known to those skilled in the art.

Figure 1:
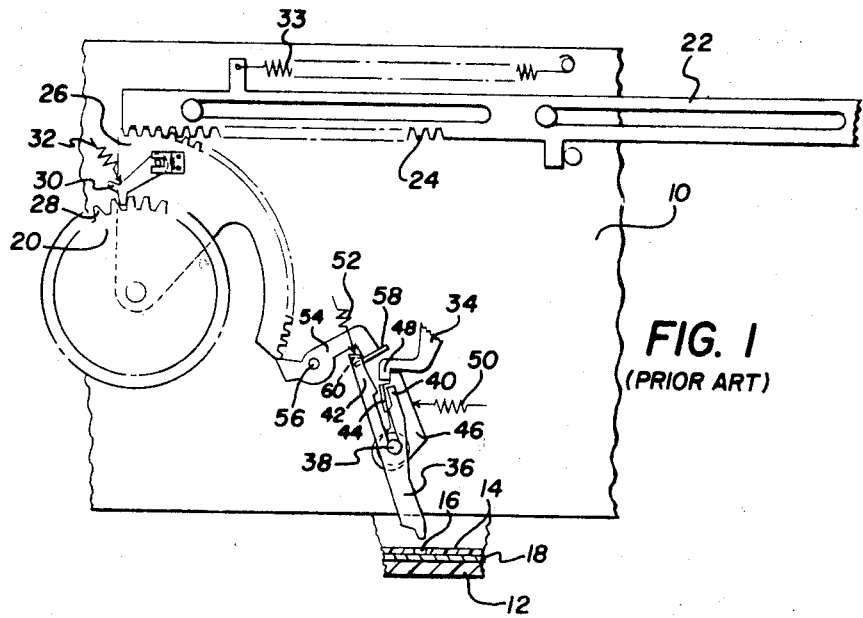
FIG. 1 is a simplified elevational view of a portion of a prior art camera.

Referring now to FIG. 1, the camera illustrated as prior art is that disclosed in the before-mentioned application to Alexander A. Peters, the disclosure of which being hereby specifically incorporated by reference herein. The camera includes a housing 10 having a space for receiving a film cartridge, partially shown at 12, containing roll film 14 with perforations along one edge, one such perforation being shown at 16. The cartridge may be of the type shown in coassigned U.S. Pat. No. 3,138,081 which issued on June 23, 1964 to Hubert Nerwin, and the film may be backed by paper 18. Such cartridges include a take-up chamber, not shown, wherein film 14 and paper 18 are wound into a roll.

Figure 10:
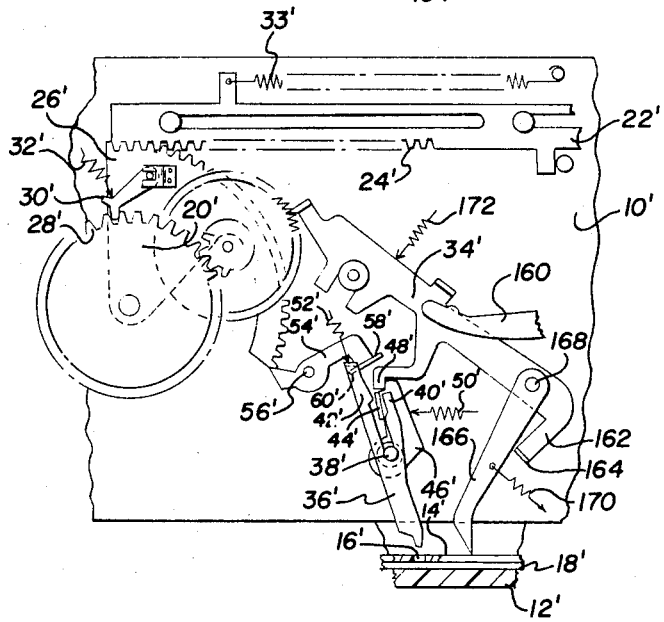
FIGS. 10 and 11 are simplified elevational views of portions of a camera in accordance with a fourth embodiment of the present invention showing two sequential relative positions of the camera elements.

A film transport mechanism includes a slide member 22 which is reciprocally mounted on housing 10 by a pin-in-slot arrangement. Slide member 22 includes a rack with a plurality of teeth 24 in meshing engagement with the teeth of a gear sector 26 coaxially rotatable with a gear 20. Rotation of gear 20 in a counterclockwise direction as shown in FIG. 1 winds film onto the take-up roll of cartridge 12. Gear 20 has a plurality of teeth 28 in meshing engagement with a ratchet pawl 30 rotatably mounted on gear sector 26. Pawl 30 is biased by a spring 32 into engagement with the teeth of gear 20 so that upon movement of slide member 22 to the left, as viewed in FIG. 1, the rotary movement of gear sector 26 is transmitted to gear 20, thereby winding film into the cartridge's take-up chamber. As slide member 22 is returned to the right by a coil spring 34, gear 20 is prevented from rotating in a clockwise direction by any suitable means such as for example as shown in the Peters application. A metering lever 34, which is fully described in the Peters application and which will be referred to in more detail with respect to FIG. 10, is movable between active and inactive positions to respectively prevent and permit rotation of gear 20.

A film sensing pawl 36 is mounted for rotational and longitudinal movement on a stud 38 on camera housing 10. Sensing pawl 36 has a pair of arms 40 and 42 which define a slot therebetween for receiving a tab 44 of a retainer 46. Retainer 46 is also rotatably carried by stud 38 and is urged in a clockwise direction into abutment with a tab 48 on metering lever 34 by a spring 50. A spring 52 urges sensing pawl 36 toward film 14.

A lifting lever 54 is rotatably carried by a stud 56 on housing 10 and has an abutment 58 which underlies an abutment 60 on arm 42 of sensing pawl 36. The other end of lifting lever 54 lies in the path of gear sector 26. The operation of the mechanism shown in FIG. 1 is fully described in the Peters application, but briefly, it is pointed out that FIG. 1 shows the elements of the camera in their respective positions after an unexposed frame of film has been wound to the exposure area. The camera is now ready to be operated to take a picture, and a metering pawl, not shown, on lever 34 is in its active position so that slide member 22 cannot be moved to the left to transport more film. Gear sector 26 has rotated lifting lever 54 to lift sensing pawl 36 from the film to a retracted position spaced from the exposure plane. It is in this condition, with the film advanced, the shutter cocked and pawl 36 removed from the perforation, that the problem of film creep occurs. Should the camera be vibrated, tortional forces on the film in the take-up chamber may cause the film to move toward the take-up chamber so that the next exposure is misaligned.

Referring to FIGS. 2-5, I have shown one embodiment of the present invention wherein a brake member is movable into contact with the film during certain periods of camera operation to prevent film creep. Like reference numerals, with a prime mark, have been used to identify parts common to this embodiment and the prior art camera of FIG. 1.

Figure 2:
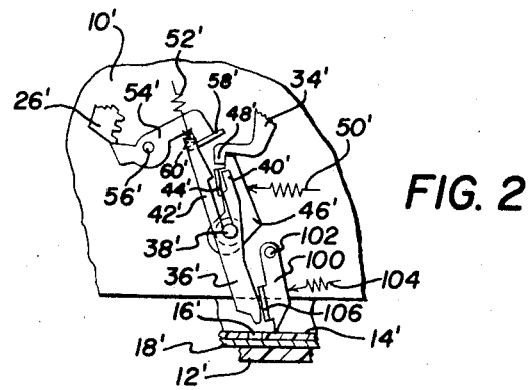
FIGS. 2-5 are simplified elevational views of portions of a camera in accordance with one embodiment of the present invention showing four sequential relative positions of the camera elements during operation of the camera.

A pointed brake member 100 is mounted on a stud 102 for movement in a clockwise direction as viewed in FIG. 2 by a spring 104. A tab 106 on brake member 150 is aligned with sensing pawl 36'. In FIG. 2, the elements of the camera are in their respective positions ready for an exposure. Pawl 36' has been withdrawn to its retracted position and the point of member 100 has been forced into contact with film 14' to hold the film from creeping to the left should the camera be subjected to vibration.

Figure 3:
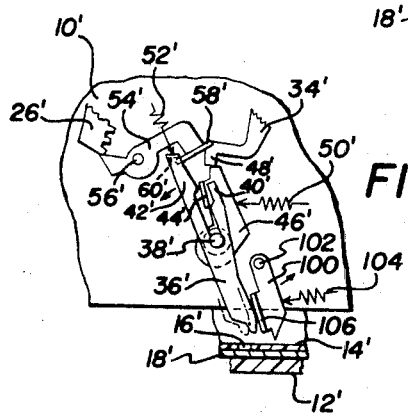
Figure 4:
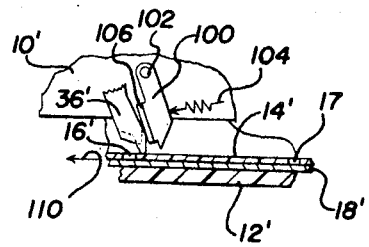

During release of the shutter mechanism, metering lever 34' is raised to the position shown in FIG. 3, thereby releasing retainer 46' so that pawl 36' can be rotated slightly in a counterclockwise direction. During this rotation, the pawl contacts tab 106 to raise brake member 100 from the film surface so that the film may be subsequentially advanced to the next frame after the exposure. Tab 48' of metering lever 34' is now above the top surface of retainer 46' and slide member 22 (in FIG. 1) can now be moved to the left. Such movement rotates gear sector 26' in a counterclockwise direction and winds film onto the cartridge take-up roll. It will be noted that gear sector 26 has been rotated away from contact with lifting arm 54' to allow spring 52' to move film sensing pawl 36' into contact with the film surface while keeping member 100 away from the film surface (FIG. 4).

Figure 5:
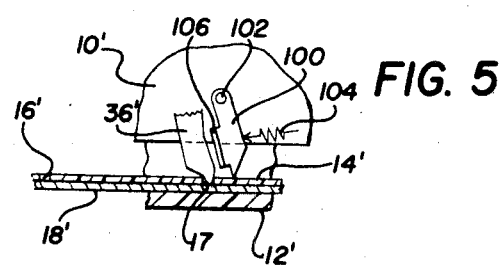

When the next succeeding film perforation 17, advancing in the direction of arrow 110, reaches the position of sensing pawl 36', the pawl drops into the perforation while remaining in contact with tab 106. The operator may continue to move slide member 22 to the left so that the trailing edge of perforation 17 causes clockwise rotation of sensing pawl 36' and retainer 46' to remove the top surface of the retainer from below tab 48' of metering lever 34', thereby allowing the metering lever to be moved by a spring, not shown, to its position shown in FIG. 2 to prevent further movement of slide member 22 to the left. As pawl 36' is moved by the film, it moves away from tab 106 of brake member 100 to allow the member to rotate back into contact with the film (FIG. 5). The slide member is now moved back to the right by spring 34, and in so moving rotates sector 26' in a clockwise direction until it contacts lifting lever 54' and rotates that lever in a counterclockwise direction to lift film sensing pawl 36' from perforation 17 as shown in FIG. 2.

Figure 6:
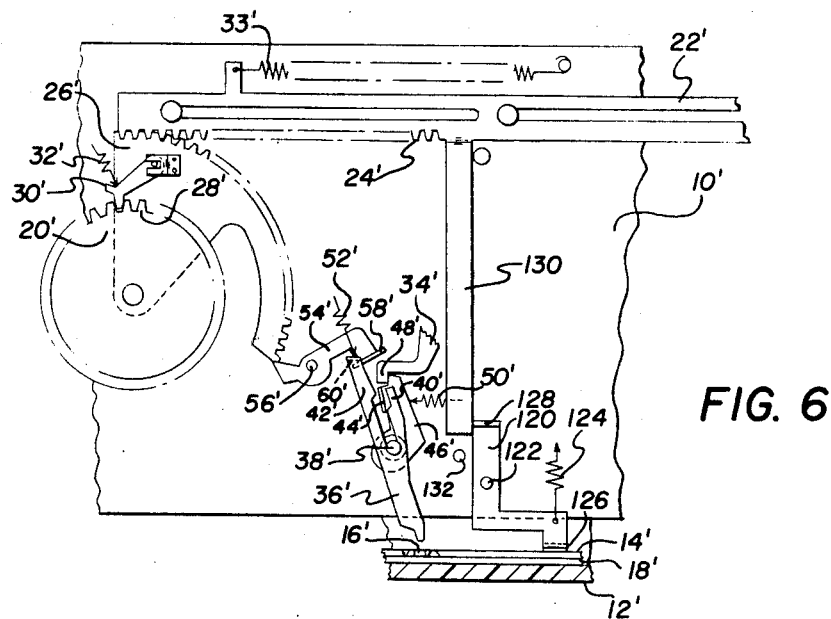
FIGS. 6 and 7 are simplified elevational views of portions of a camera in accordance with a second embodiment of the present invention showing two sequential relative positions of the camera elements.
Figure 7:
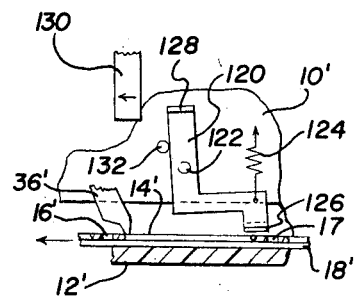

Referring to FIGS. 6 and 7, I have shown another embodiment of the present invention wherein a brake member 120 is movable into contact with the film to prevent film creep. Like reference numerals, with a prime mark, have also been used to identify parts, common to this embodiment and the prior art camera of FIG. 1.

Brake member 120 is mounted on a stud 122 for movement in a counterclockwise direction as viewed in FIG. 6 by a spring 124. A pressure pad 126 is supported on one end of brake member 120 for contact with the film surface. A bent tab 128 is aligned with an arm 130 extending from slide member 22'. In FIG. 6, the elements of the camera are in their respective positions ready for an exposure. Pawl 36' has been withdrawn to its retracted position, slide 22' has been returned to its rest position by spring 34' and arm 130 is abutting tab 128 to rotate member 120 against the force of spring 124 so that pressure pad 126 is held in firm contact with film 14' to prevent film creep. When slide member 22' is moved to the left to advance film, arm 130 is moved away from tab 128 so that spring 124 will lift pressure pad 126 from the film surface, brake member 120 abutting a stud 132 as viewed in FIG. 7. When slide 22' returns to the right, arm 130 re-engages tab 128 to move pressure pad 126 back into contact with the film, thereby preventing film creep.

Figure 8:
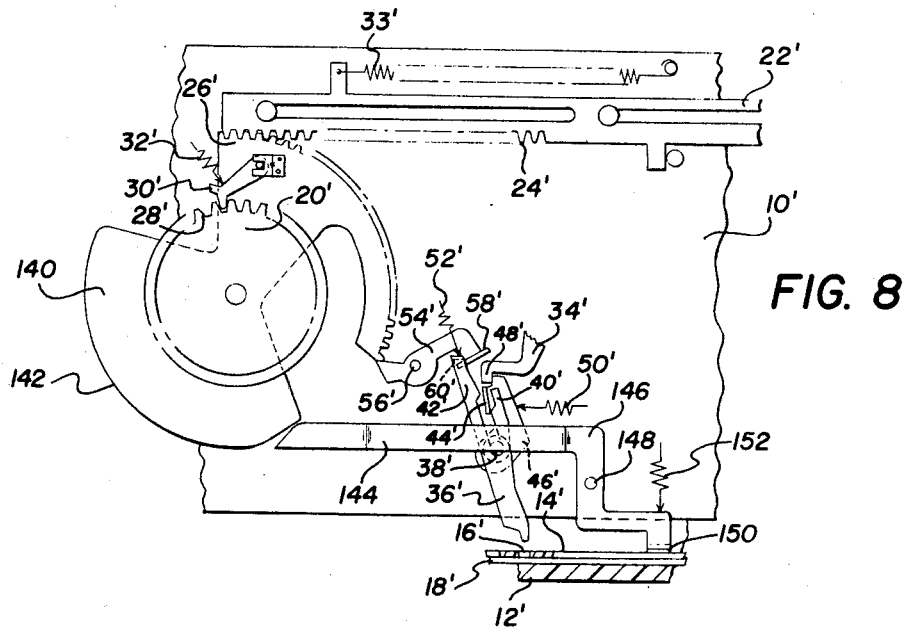
FIGS. 8 and 9 are simplified elevational views of portions of a camera in accordance with a third embodiment of the present invention showing two sequential relative positions of the camera elements.
Figure 9:
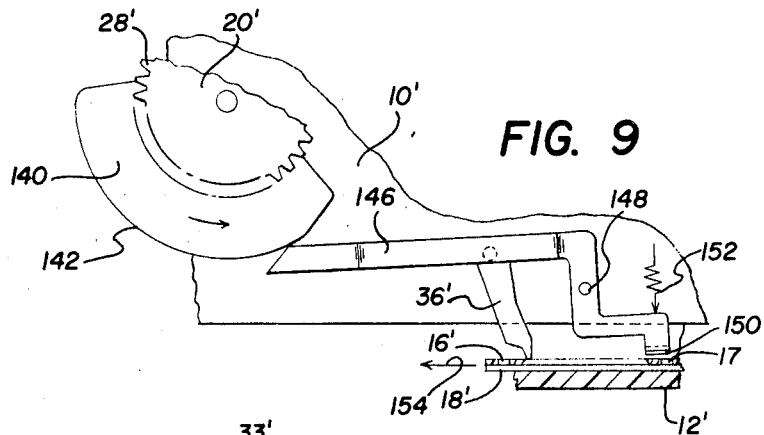

I have shown a third embodiment of the present invention in FIGS. 8 and 9. Again, like reference numerals, with a prime mark, have been used to identify parts common to this embodiment and the prior art camera of FIG. 1. Sector 26' has a cam lobe 140 with a cam surface 142 aligned with a cam follower arm 144 of a brake member 146 which is pivotally mounted on a stud 148 and which carries a pressure pad 150 for engagement with the film surface. Brake member 146 is urged in a clockwise direction about stud 148 by a spring 152. FIG. 8 shows the camera elements in their metered condition with slide 22' returned to its rest position. As slide 22' is moved to the left, cam surface 142 engages cam follower arm 144 as shown in FIG. 9 to rotate brake member 146 in a counterclockwise direction about stud 148 to raise pressure pad 150 from the film surface so that the film may be advanced in the direction of arrow 154. Otherwise, operation of the embodiment of FIGS. 8 and 9 is similar to that of the embodiment shown in FIGS. 6 and 7.

Figure 11:
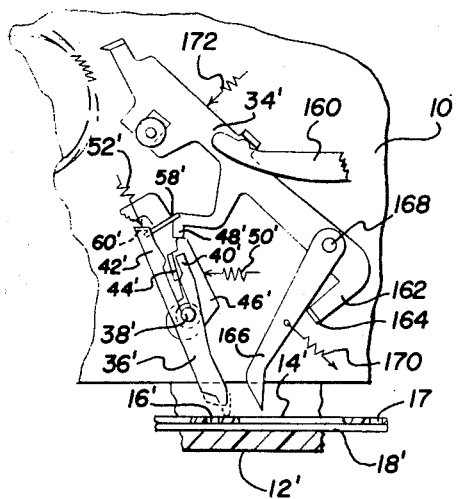

Referring now to FIGS. 10 and 11, I have shown therein a complete metering lever 34', the operation of that lever with a shutter release lever 160 is explained in the Peters application. Metering lever 34' is provided with a leg 162 having a bent tab portion 164 thereon. A brake member 166 is pivotally mounted to metering lever 34' at 168 and is urged in a counterclockwise direction by a spring 170. FIG. 10 shows the camera elements in their metered position ready for an exposure, and FIG. 11 shows the elements when the camera is unmetered and before film has been advanced. Referring back to FIG. 10, it can be seen that metering lever 34' has been rotated by a spring 172 until tab 164 has been pulled away from brake member 166 so that spring 170 may urge member 166 into contact with the film surface to prevent film creep. As the picture is taken, shutter release lever 160 lifts the metering lever so that tab 164 moves into abutment with brake member 166 to lift the brake member from the film surface, thereby permitting advancement of the film to the next frame.

From the above, it can be seen that I have presented various embodiments of the present invention wherein a brake member is movable into contact with the film surface during periods in which film creep would present a problem. By such member, the film is secured against movement along the exposure plane.

The invention has been described in detail with particular reference to preferred embodiments thereof, but it will be understood that variations and modifications can be effected within the spirit and scope of the invention.

I claim:

1. In a camera having (1) a housing including a space for receiving roll film perforated at predetermined metering intervals, (2) means defining an exposure plane, (3) transport means operable for advancing film along said exposure plane, and (4) a metering mechanism having an active condition disabling said transport means and an inactive condition, the improvement comprising:

a brake member movable between an active position contacting received film to prevent film movement along said exposure plane and an inactive position; and means for moving said brake member to its inactive position when said metering mechanism is in its inactive condition and for moving said brake member to its active position when said metering mechanism is in its active condition, whereby said brake member is effective to prevent film movement when said transport means is disabled.

2. The improvement as defined in claim 1 wherein: said metering mechanism comprises a film sensing pawl having a first condition when said metering mechanism is in its active condition and a second condition when said metering mechanism is in its inactive condition;

said means for moving said brake member includes (1) spring means urging said brake member toward its active position and (2) abutment means, contactable by said sensing pawl in its second condition to move said brake member to its inactive position.

3. The improvement as defined in claim 2 further comprising:

means mounting said sensing pawl on said housing for rotational movement; and means constraining said sensing pawl to a first angular position in its first condition and to a second angular position in its second condition.

4. The improvement as defined in claim 1 wherein:

said metering mechanism comprises a film sensing pawl (1) rotatable between first and second angular positions and (2) movable between a retracted position on one side of said exposure plane and an extended position transversing said exposure plane through one of the film perforations, said sensing pawl assuming its first angular position when said metering mechanism is in its active condition and its second angular position when said metering mechanism is in its inactive condition; and said means for moving said brake member includes (1) spring means for urging said brake member toward its active position and (2) abutment means, contactable by said sensing pawl in its second angular position to move said brake member to its inactive position.

5. In a camera having (1) a housing including a space for receiving perforated roll film, (2) means defining an exposure plane, (3) transport means operable for advancing received film along said exposure plane, (4) a film sensing pawl adapted to enter a film perforation to detect the presence of a perforation at a predetermined position along the exposure plane, (5) means associated with said transport means and said sensing pawl for disabling said transport means upon detection of a perforation at said predetermined position and (6) exposure means, operable after said transport means has been disabled, for effecting exposure of the film; the improvement comprising:

means for withdrawing said sensing pawl from a perforation after said transport means has been disabled and before operation of said exposure means;

a brake member movable between an active position contacting received film to prevent film movement along said exposure plane and an inactive position; and means (1) for moving said brake member to its inactive position during operation of said transport means and (2) for moving said brake member to its active position when said transport means is not being operated to advance film.

6. The improvement as defined in claim 5 wherein said moving means comprises:

spring means urging said brake member toward its active position, and means interconnecting said brake member and said transport means for moving said brake member to its inactive position during operation of said transport means.

7. The improvement as defined in claim 5 wherein said moving means comprises:

spring means urging said brake member toward its inactive position; and means interconnecting said brake member and said transport means for moving said brake member to its active position when said transport means is not being operated.

8. A camera of the type adapted to receive roll film perforated at predetermined metering intervals and having (1) transport means for advancing received film along the camera's exposure plane, (2) a metering mechanism operable for disabling said transport means, (3) exposure means operable for effecting exposure of film at said exposure plane, (4) a film sensing pawl movable between a retracted position on one side of said exposure plane and an extended position traversing said exposure plane through one of the film perforations to detect the presence of a perforation at a predetermined position and (5) means associated with said sensing pawl and said metering mechanism for operating said metering mechanism to disable said transport means when said sensing pawl is in its extended position and detects the presence of a perforation at said predetermined position; said camera comprising:

means associated with said sensing pawl and said transport means for moving said sensing pawl to its retracted position except during operation of said transport means;

a brake member movable between an inactive position and an active position contacting received film to prevent film movement along said exposure plane; and means for locating said brake member in its active position at least during the interval between (1) operation of said metering mechanism to disable said transport means and (2) operation of said exposure effecting means.

9. A camera as defined in claim 8 wherein said locating means comprises:

spring means for urging said brake member toward its active position; and means associated with said brake member and said sensing pawl for moving said brake member to its inactive position upon operation of said exposure means.

10. A camera as defined in claim 8 wherein said locating means comprises:

spring means for urging said brake member toward its inactive position; and means associated with said brake member and said transport means for moving said brake member to its active position when said transport means is not being operated.

11. A camera as defined in claim 8 wherein said locating means comprises:

spring means for urging said brake member toward its active position; and means associated with said brake member and said transport means for moving said brake member to its inactive position upon operation of said transport means.

* * * * *